United States Patent
Rider

(10) Patent No.: US 11,827,735 B1
(45) Date of Patent: Nov. 28, 2023

(54) HFO-CONTAINING ISOCYANATE-REACTIVE COMPOSITIONS, RELATED FOAM-FORMING COMPOSITIONS AND FLAME RETARDANT PUR-PIR FOAMS

(71) Applicant: Covestro LLC, Pittsburgh, PA (US)

(72) Inventor: Shawn Rider, Harrisville, PA (US)

(73) Assignee: COVESTRO LLC, Pittsburgh, PA (US)

( * ) Notice: Subject to any disclaimer, the term of this patent is extended or adjusted under 35 U.S.C. 154(b) by 0 days.

(21) Appl. No.: 17/901,193

(22) Filed: Sep. 1, 2022

(51) Int. Cl.
| | |
|---|---|
| C08G 18/08 | (2006.01) |
| C08G 18/12 | (2006.01) |
| C08G 18/16 | (2006.01) |
| C08G 18/18 | (2006.01) |
| C08G 18/20 | (2006.01) |
| C08G 18/22 | (2006.01) |
| C08G 18/40 | (2006.01) |
| C08G 18/42 | (2006.01) |
| C08G 18/48 | (2006.01) |
| C08G 18/50 | (2006.01) |
| C08J 9/12 | (2006.01) |
| C08J 9/14 | (2006.01) |
| C08J 9/00 | (2006.01) |
| C08G 101/00 | (2006.01) |

(52) U.S. Cl.
CPC ............ *C08G 18/14* (2013.01); *C08G 18/12* (2013.01); *C08G 18/161* (2013.01); *C08G 18/1875* (2013.01); *C08G 18/2018* (2013.01); *C08G 18/2027* (2013.01); *C08G 18/225* (2013.01); *C08G 18/4018* (2013.01); *C08G 18/4208* (2013.01); *C08G 18/4804* (2013.01); *C08G 18/4845* (2013.01); *C08G 18/5024* (2013.01); *C08J 9/0047* (2013.01); *C08J 9/125* (2013.01); *C08J 9/146* (2013.01); *C08G 2101/00* (2013.01); *C08G 2110/0025* (2021.01); *C08G 2330/00* (2013.01); *C08J 2203/10* (2013.01); *C08J 2203/142* (2013.01); *C08J 2205/10* (2013.01); *C08J 2375/06* (2013.01); *C08J 2375/08* (2013.01)

(58) Field of Classification Search
None
See application file for complete search history.

(56) References Cited

U.S. PATENT DOCUMENTS

| | | | |
|---|---|---|---|
| 1,081,196 A | 12/1913 | Baker | |
| 3,161,682 A | 12/1964 | Lesesne et al. | |
| 5,686,500 A | 11/1997 | Fishback et al. | |
| 5,690,855 A | 11/1997 | Nichols et al. | |
| 8,299,137 B2 | 10/2012 | Creazzo et al. | |
| 8,541,478 B2 | 9/2013 | Hamilton et al. | |
| 8,558,040 B2 | 10/2013 | Creazzo et al. | |
| 8,927,614 B2 | 1/2015 | Fricke et al. | |
| 9,051,442 B2 | 6/2015 | Bogdan et al. | |
| 9,453,115 B2 | 9/2016 | Van et al. | |
| 9,550,854 B2 | 1/2017 | Nair et al. | |
| 9,556,303 B2 | 1/2017 | Ross et al. | |
| 9,556,335 B2 | 1/2017 | Chen et al. | |
| 9,587,080 B2 | 3/2017 | Hamilton et al. | |
| 9,809,674 B2 | 11/2017 | Shieh et al. | |
| 9,868,837 B2 | 1/2018 | Philippe et al. | |
| 9,988,483 B2 | 6/2018 | Forkner et al. | |
| 10,131,758 B2 | 11/2018 | Usama et al. | |
| 10,308,783 B2 | 6/2019 | Chen et al. | |
| 10,392,487 B2 | 8/2019 | Taylor et al. | |
| 10,640,600 B2 | 5/2020 | Rider et al. | |
| 10,752,725 B2 | 8/2020 | Rider et al. | |
| 2007/0100009 A1 | 5/2007 | Creazzo et al. | |
| 2007/0173556 A1 | 7/2007 | Prange et al. | |
| 2010/0210747 A1 | 8/2010 | Loh et al. | |
| 2010/0216904 A1 | 8/2010 | Loh et al. | |
| 2011/0124756 A1 | 5/2011 | Singh et al. | |

(Continued)

FOREIGN PATENT DOCUMENTS

| | | |
|---|---|---|
| CN | 103709727 A | 4/2014 |
| CN | 104497251 A | 4/2015 |

(Continued)

OTHER PUBLICATIONS

Covestro LLC; Baytherm 3199 Product Information sheet; Rigid Polyurethane Foam System; 2 pgs.
U.S. Appl. No. 17/341,898, filed Jun. 8, 2021.

*Primary Examiner* — Melissa A Rioja
(74) *Attorney, Agent, or Firm* — Donald R. Palladino

(57) ABSTRACT

Hydrofluoroolefin ("HFO")-containing isocyanate-reactive compositions, foam-forming compositions containing such isocyanate-reactive compositions, rigid foams made using such foam-forming compositions, and methods for producing such foams, including use of such foams as panel insulation. The isocyanate-reactive compositions include a polyol composition, a blowing agent composition, and a catalyst composition. The polyol composition includes 50% to 80% by weight, based on total weight of the polyol composition, of an aromatic polyester polyol having a functionality of 1.5 to 2.5 and an OH number of 150 to 360 mg KOH/g, and an amine-initiated polyether polyol having an OH number of more than 500 mg KOH/g and a functionality of 2.5 to 4. The blowing agent composition includes a hydrofluoroolefin and water. The catalyst composition includes a morpholine, an imidazole, a quaternary ammonium carboxylate, and a metal carboxylate.

20 Claims, No Drawings

(56) References Cited

U.S. PATENT DOCUMENTS

| | | |
|---|---|---|
| 2011/0152392 A1 | 6/2011 | Van et al. |
| 2012/0172476 A1 | 7/2012 | Bhat et al. |
| 2012/0202904 A1 | 8/2012 | Chen et al. |
| 2012/0220677 A1 | 8/2012 | Bogdan et al. |
| 2012/0313035 A1 | 12/2012 | Williams et al. |
| 2014/0005288 A1 | 1/2014 | Chen et al. |
| 2014/0051776 A1 | 2/2014 | Chen et al. |
| 2014/0171525 A1 | 6/2014 | Yu et al. |
| 2014/0220333 A1 | 8/2014 | Bogdan et al. |
| 2014/0364528 A1 | 12/2014 | Rexrode et al. |
| 2015/0210818 A1 | 7/2015 | Loh |
| 2015/0232631 A1 | 8/2015 | Yayun et al. |
| 2016/0130416 A1 | 5/2016 | Chen et al. |
| 2016/0145374 A1 | 5/2016 | Atsushi et al. |
| 2016/0152739 A1 | 6/2016 | Eilbracht et al. |
| 2017/0081491 A1 | 3/2017 | Chen et al. |
| 2017/0313806 A1 | 11/2017 | Yu et al. |
| 2018/0134861 A1 | 5/2018 | Schilling et al. |
| 2019/0136005 A1 | 5/2019 | Williams et al. |
| 2019/0194413 A1 | 6/2019 | Okada et al. |
| 2019/0322790 A1 | 10/2019 | Rider et al. |
| 2019/0322791 A1 | 10/2019 | Rider et al. |
| 2020/0283561 A1 | 9/2020 | Parks et al. |
| 2020/0283563 A1 | 9/2020 | Parks et al. |
| 2020/0339733 A1 | 10/2020 | Rider et al. |
| 2021/0079189 A1 | 3/2021 | Shinko et al. |
| 2021/0163663 A1 | 6/2021 | Welsch et al. |
| 2022/0220249 A1 | 7/2022 | Rider et al. |
| 2022/0389148 A1* | 12/2022 | Bell .................. C08G 18/7685 |
| 2022/0403096 A1* | 12/2022 | Schilling ............... C08G 18/482 |
| 2022/0412080 A1* | 12/2022 | Giles ................... C08G 18/242 |

FOREIGN PATENT DOCUMENTS

| | | |
|---|---|---|
| CN | 103804711 B | 5/2016 |
| EP | 0091828 B1 | 1/1987 |
| WO | 2007053670 A2 | 5/2007 |
| WO | 2009014965 A1 | 1/2009 |
| WO | 2012105657 A1 | 8/2012 |
| WO | 2013081809 A1 | 6/2013 |
| WO | 2014134087 A1 | 9/2014 |
| WO | 2017050887 A1 | 3/2017 |
| WO | 2015050139 A1 | 4/2017 |
| WO | 2019209794 A1 | 10/2019 |
| WO | 2020223059 A1 | 11/2020 |

* cited by examiner

HFO-CONTAINING ISOCYANATE-REACTIVE COMPOSITIONS, RELATED FOAM-FORMING COMPOSITIONS AND FLAME RETARDANT PUR-PIR FOAMS

FIELD

This specification pertains generally to hydrofluoroolefin ("HFO")-containing isocyanate-reactive compositions, foam-forming compositions containing such isocyanate-reactive compositions, rigid foams made using such foam-forming compositions, and methods for producing such foams, including use of such foams as panel insulation.

BACKGROUND

Flame-retardant rigid polyurethane foams are used in numerous industries. They are produced by reacting an appropriate polyisocyanate and an isocyanate-reactive compound, usually a polyol, in the presence of a blowing agent and catalysts to produce polyisocyanurate-containing and polyurethane-containing foams. One use of such foams is as a thermal insulation medium in the construction of panel assemblies, such as doors, including garage doors. The thermal insulating properties of closed-cell rigid foams are dependent upon a number of factors, including the average cell size and the thermal conductivity of the contents of the cells.

Chlorofluorocarbons (CFC's) and hydrogen-containing chlorofluorocarbons (HCFC's) have been used as blowing agents to produce these foams because of their exceptionally low vapor thermal conductivity. However, their ozone-depletion potential is a drawback to their use. Alternative blowing agents, such as hydrofluorocarbons (HFC's), are greenhouse gases. Hydrocarbons, such as pentane isomers, are flammable and have lower energy efficiency. HFO's are now replacements for HFCs, since their chemical instability in the lower atmosphere provides for a low global warming potential and zero or near zero ozone depletion properties.

Formulations used to produce thermally insulating rigid polyurethane foam, particularly those used in the construction of panel assemblies, utilize catalysts to control the relative rates of water-polyisocyanate (gas-forming or blowing), the polyol-polyisocyanate (gelling) reaction to form polyurethane ("PUR"), and the isocyanate-isocyanate trimerization reaction to form polyisocyanurate ("PIR"). In the gelling reaction, the isocyanate reacts with polyols to form the polyurethane foam matrix. In the trimerization reaction, isocyanates react with one another to form macromolecules with isocyanurate structures (polyisocyanurates). In the blowing reaction, the isocyanate reacts with water in the formulation to form polyurea and carbon dioxide. While these reactions take place at different rates, it is necessary to properly balance them to produce high-quality foam. For example, if the blowing reaction occurs faster than the gelling reaction, the gas generated by the reaction may expand before the polyurethane matrix is strong enough to contain it and foam collapse can occur. In contrast, if the gelling reaction occurs faster than the blowing reaction, the foam cells will remain closed, causing the foam to shrink as it cools. Moreover, if the gelling reaction occurs while the reaction mixture is still flowing, cell stretching may occur, resulting in elongated cell structures. Foams with such elongated cell structures generally exhibit poorer physical properties, such as poorer compressive strength, poorer dimensional stability (more foam shrinkage), poorer thermal insulation properties, and poorer foam quality (due to surface voids and other defects).

As a result, to achieve the proper balance, formulations often utilize a combination of blow catalysts, gel catalysts, and/or trimerization catalysts. Amine catalysts, for example, are known to have a greater effect on the water-polyisocyanate blowing reaction, whereas organotin catalysts are known to have a greater effect on the polyol-polyisocyanate gelling reaction.

A drawback to at least some HFOs, such as 1,3,3,3-tetrafluoropropene (HFO-1234ze(E)) and 1-chloro-3,3,3-trifluoropropene (HCFO-1233zd), as blowing agents in the production of satisfactory isocyanate-based foams is poor shelf-life. Blowing agents often are combined with polyols and other components, such as surfactant(s) and the catalyst(s), to form a so-called "B-side" pre-mix that may be stored for up to several months prior to being combined with an "A-side" isocyanate component to form the foam. With such HFOs, however, if the B-side composition is aged prior to combining with the polyisocyanate, the foam can be of lower quality and may even collapse during the formation of foam. The poor foam structure is thought to be attributable to the reaction of certain catalysts, particularly amine catalysts, with these HFOs which results in the partial decomposition of the blowing agent and, as a result, undesirable modification of silicone surfactants, resulting in poor foam structure and quality.

Foam-forming compositions used in the production of certain panel assemblies, particularly those produced in a continuous open pour processes often must exhibit a stringent combination of properties. For example, in addition to possessing good thermal insulation properties, many foams must pass at least Class B E84 burn requirements for smoke and flame spread, which means that they must exhibit a flame spread index (FSI) of 75 or less and a smoke-developed index (SDI) of 450 or less according to ASTM E84-21 at the applied foam thickness. They also must exhibit a foam rise profile that is suitable for use in a continuous manufacturing process such that the produced foam has sufficient green strength shortly after exiting a continuous mold. Further, the composition used to produce the foam must exhibit a long shelf life, which means that the gel time cannot change by a large amount after storage of the foam-forming composition components for a long period of time (several months or more), even when a chemical blowing agent, such as water, is also used. Finally, it is desirable that the foam-forming composition can exhibit such properties regardless of whether a gaseous HFO, such as HFO-1234ze(E) or a liquid HFO, such as HCFO-1233zd, is employed.

A composition that can fulfill most, if not all, of these requirements would, therefore, before highly desirable.

SUMMARY

In some respects, the present disclosure is directed to isocyanate-reactive compositions. These compositions comprise: (a) a polyol composition, (b) a blowing agent composition, and (c) a catalyst composition. The polyol composition comprises: (1) 50% to 90% by weight, based on total weight of the polyol composition, of an aromatic polyester polyol having a functionality of 1.5 to 2.5 and an OH number of 150 to 360 mg KOH/g; and (2) an amine-initiated polyether polyol having an OH number of more than 500 mg KOH/g and a functionality of 2.5 to 4. The blowing agent composition comprises: (1) a hydrofluoroolefin; and (2) water. The catalyst composition comprises:

(1) a morpholine; (2) an imidazole; (3) a quaternary ammonium carboxylate; and (4) a metal carboxylate.

In other respects, this disclosure is directed to foam-forming compositions. These compositions comprise: (a) a polyol composition, (b) a blowing agent composition, (c) a catalyst composition, and (d) a polyisocyanate. The polyol composition comprises: (1) 50% to 90% by weight, based on total weight of the polyol composition, of an aromatic polyester polyol having a functionality of 1.5 to 2.5 and an OH number of 150 to 360 mg KOH/g; and (2) an amine-initiated polyether polyol having an OH number of more than 500 mg KOH/g and a functionality of 2.5 to 4. The blowing agent composition comprises: (1) a hydrofluoroolefin; and (2) water. The catalyst composition comprises: (1) a morpholine; (2) an imidazole; (3) a quaternary ammonium carboxylate; and (4) a metal carboxylate. The polyisocyanate in present an amount sufficient to provide an isocyanate index of 90 to 180.

The present disclosure is also directed rigid PUR-PIR foams produced from such foam-forming compositions, methods for making such rigid foams, and composite articles comprising such rigid foams, and panel insulation that includes such rigid foams.

DETAILED DESCRIPTION

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

As indicated, certain implementations of the present specification relate to isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part 11 Technology," J. H. Saunders & K. C. Frisch, Interscience Publishers, 1964, page 239.

The rigid foams of this specification are the reaction product of a polyurethane-foam forming composition that includes: (a) a polyisocyanate; and (b) an isocyanate-reactive composition. As used herein, the term "polyisocyanate" encompasses diisocyanates and other isocyanates having more than one isocyanate (—NCO) functional group per molecule.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

The isocyanate-reactive compositions described in this specification comprise a polyol composition. More specifically, the polyol composition comprises an aromatic polyester polyol and an amine-initiated polyether polyol.

The polyol composition present in the isocyanate-reactive compositions of this specification comprises an aromatic polyester polyol having a functionality of 1.5 to 2.5 and an OH number of 150 to 360 mg KOH/g. Suitable such aromatic polyester polyols include, for example, the reaction product of an aromatic diacid or anhydride with a suitable glycol and/or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof. Some examples of the suitable aromatic polyester polyols include those compounds available from Stepan Chemical under the Stepanpol trade name such as, for example, Stepanpol® PS 3024 and Stepanpol PS 2502A or under the Terate trade name, such as Terate® HT-5100 and HT-5500, or from Coim under the Isoexter trade name such as Isoexter® TB-375.

In some implementations, the foregoing aromatic polyester polyol has an OH number of 200 to 335 mg KOH/g, or, in some cases, 200 to 250 mg KOH/g, and a functionality of 1.8 to less than 2.5, such as 1.8 to 2.2 or 1.9 to 2.1.

In the isocyanate-reactive compositions of this specification, the aromatic polyester polyol having a functionality of 1.5 to 2.5 and an OH number of 150 to 360 mg KOH/g is present in an amount of 50 to 90% by weight, such as 50 to 80% by weight, 60 to 80% by weight, or, in some cases, 60 to 70% by weight, based on the total weight of the polyol composition that is in the isocyanate-reactive composition. In some implementations, aromatic polyester polyol present in an amount of 30 to 50% by weight, 35 to 50% by weight, or, in some cases 40 to 50% by weight, based on total weight of the isocyanate-reactive composition.

The polyol composition further comprises an amine-initiated polyether polyol. As used herein, "amine-initiated polyether polyol" refers a polyether polyol that is the reaction product of an alkylene oxide with an H-functional starter comprising an amine group-containing compound. In some implementations, the amine group-containing compound contains primary and/or secondary amine groups, and, in some cases, may be free of tertiary amine groups. Such compounds may also contain one or more hydroxyl groups.

The amine group-containing compound may comprise, for example, an aliphatic, aliphatic, or aromatic amine, or a mixture of any two or more thereof. Examples of suitable aliphatic amines are, for example, methyl amine, ethylene diamine, and diethylene triamine, as well as a mixture of any two or more thereof.

In some cases, however, the amine-initiated polyether polyol comprises an aromatic amine-initiated polyether polyol. As used herein, "aromatic amine-initiated polyether polyol" refers to a polyether polyol that is the reaction product of an H-functional starter comprising an aromatic amine, such as toluenediamine ("TDA"), and alkylene oxide.

In certain implementations, the aromatic amine employed has an amine functionality of at least 1, such as 1 to 3 or 1 to 2. Specific examples of suitable aromatic amines which can be used include crude TDA obtained by the nitration of toluene followed by reduction; 2,3-TDA, 3,4-TDA, 2,4-TDA, 2,6-TDA or mixtures thereof; aniline; 4,4'-methylene dianiline; methylene-bridged polyphenyl polyamines composed of isomers of methylene dianilines and triamines or polyamines of higher molecular weight prepared by reacting aniline with formaldehyde by methods known in the art. In some implementations, a mixture composed of 2,3-TDA and 3,4-TDA (commonly referred to as "o-TDA") is used.

In addition to the aromatic amine, other H-functional starters may also be used to prepare the aromatic amine-initiated polyether polyol. These other H-functional starters include, for example, water, propylene glycol, glycerin, ethylene glycol, ethanol amines, diethylene glycol, or a mixture of any two or more thereof. As will be appreciated, it is possible to use a wide variety of individual starters in combination with one another. In some implementations, however, aromatic amine is the predominant or essentially sole H-functional starter used to produce the aromatic amine-initiated polyether polyol. This means that, in these implementations, aromatic amine is present in an amount of more than 50% by weight, such as at least 80% by weight, at least 90% by weight, or even 100% by weight, based on the total weight of H-functional starter used to produce the aromatic amine-initiated polyether polyol.

A variety of alkylene oxides may be used to produce the aromatic amine-initiated polyether polyol, such as ethylene oxide, propylene oxide, butylene oxide, amylene oxide and mixtures thereof. The alkylene oxides may be added individually, sequentially one after the other to form blocks or in a mixture to form a heteric polyether. The aromatic amine-initiated polyether polyols may have primary or secondary hydroxyl end groups. In some implementations, propylene oxide is the primary or essentially sole alkylene oxide used to prepare the aromatic amine-initiated polyether polyol. This means that, in these implementations, propylene oxide is used in an amount of more than 50% by weight, such as at least 80% by weight, at least 90% by weight, or even 100% by weight, based on the total weight of alkylene oxide used to prepare the aromatic amine-initiated polyether polyol. In some implementations, ethylene oxide is employed in a relatively small amount. In these implementations, ethylene oxide is used in an amount of no more than 10% by weight, no more than 5% by weight, no more than 1% by weight, or, in some cases, 0% by weight, based on the total weight of alkylene oxide used to prepare the aromatic amine-initiated polyether polyol.

In some implementations, the amine-initiated polyol comprises an alkanolamine-initiated polyether polyol. As used herein, "alkanolamine-initiated polyether polyol" refers to a polyether polyol prepared by reacting an alkylene oxide with one or more suitable starter compounds in the presence of a suitable catalyst, in which the starter compounds comprise one or more alkanolamines. Suitable catalysts including basic catalysts (such as sodium or potassium hydroxide or tertiary amines such as methyl imidazole) and DMC catalysts.

As used herein, the term "alkanolamine" refers to compounds represented by the formula:

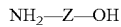

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms. The dialkylene ether radical may be represented by the formula:

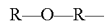

where each R represents a hydrocarbon radical having 2 to 3 carbon atoms.

Specific examples of suitable alkanolamines that may be used in the preparation of the alkanolamine-initiated polyether polyol include monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, as well as mixtures of any two or more thereof.

To prepare the alkanolamine-initiated polyether polyol, the alkanolamine is reacted with an alkylene oxide. Suitable alkylene oxides include ethylene oxide, propylene oxide, butylene oxide, styrene oxide, and epichlorohydrin, as well as mixtures of any two or more thereof.

In some implementations, the amine-initiated, such as alkanolamine-initiated, polyether polyol has an OH number of more than 500 mg KOH/g, such as more than 500 to 900 mg KOH/g, such as 600 to 800 mg KOH/g, or, in some cases, 680 to 720 mg KOH/g, and a functionality of 2.5 to 4, such as 2.5 to 3.5.

In some implementations, the amine-initiated, such as alkanolamine-initiated, polyether polyol is present in an amount of 0.1 to 10% by weight, such as 1 to 10% by weight or 2 to 6% by weight, based upon the total weight of the polyol composition that is in the isocyanate-reactive composition. In some implementations, the amine-initiated, such as alkanolamine-initiated, polyether polyol is present in an amount of 0.1 to 10% by weight, 0.1 to 5% by weight, or, in some cases 1 to 5% by weight, based on the total weight of the isocyanate-reactive composition. In certain implementations, aromatic polyester polyol and amine-initiated, such as alkanolamine-initiated, polyether polyol are present in the polyol composition in a weight ratio of at least 10:1, such as 10:1 to 50:1, or, in some cases 10:1 to 30:1 or 10:1 to 20:1.

The polyol composition may, and often does, include additional polyols, such as other polyether polyols. In some implementations, the polyol composition comprises a polyether polyol that is an addition product of alkylene oxide, such as styrene oxide, ethylene oxide, propylene oxide, butylene oxide, epichlorohydrin, or a mixture thereof, onto di- or polyfunctional starter molecules. Examples of useful starter molecules include water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and low molecular weight hydroxyl-containing esters of such polyols with dicarboxylic acids.

For example, in some implementations, the polyol composition comprises a relatively high-functionality polyether polyol, such as those having a hydroxyl functionality of more than 4.0. More particularly, in some implementations, such a relatively high-functionality polyether polyol comprises a saccharide-initiated polyether polyol. As used herein, "saccharide-initiated polyether polyol" refers to a polyether polyol prepared by reacting an alkylene oxide with one or more suitable starter compounds in the presence of a suitable catalyst, in which the starter compounds comprise one or more saccharide initiators. Examples of suitable alkylene oxides include ethylene oxide, propylene oxide, butylene oxide, styrene oxide, epichlorohydrin, or a mixture of any two or more thereof. Some examples of suitable saccharide initiators are sucrose, sorbitol, maltitol, etc. as well as other mono-saccharides, di-saccharides, tri-saccharides and polysaccharides. Other initiator compounds are often used in combination with the saccharide initiator to prepare the saccharide initiated polyether polyol. Saccharides can be co-initiated with for example, compounds such as water, propylene glycol, glycerin, ethylene glycol, ethanol amines, diethylene glycol, or a mixture of any two or more thereof. As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole) and double metal cyanide (DMC) catalysts.

In some implementations, the saccharide, such as sucrose, is first reacted with ethylene oxide and then propylene oxide. In some cases, the ethylene oxide is used in an amount of 10 to 50%, such as from 20 to 40%, by weight of the total alkylene oxide used and the propylene oxide is used in an amount of from 50 to 90%, such as 60 to 80%, by weight of the total alkylene oxide used. In some implementations, the total amount of alkylene oxide used is selected so that the product has an average molecular weight of 300 to 1600 Da, such as 440 to 1000 Da.

In some implementations, the saccharide initiated polyether polyol has an OH number of from 200 to 600 mg KOH/g, such as 300 to 550 mg KOH/g, such as 400 to 500 mg KOH/g, or, in some cases, 450 to 500 mg KOH/g, and a functionality of more than 4.0 to 6, such as 5 to 6, 5.2 to 5.8, or 5.2 to 5.4.

In some implementations, the saccharide-initiated polyether polyol is present in an amount of 1 to 40% by weight, such as 10 to 30% by weight, or, in some cases, 15 to 25% by weight, based on the total weight of the polyol composition. In some implementations, the saccharide-initiated polyether polyol is present in an amount of 1 to 30% by weight, such as 10 to 20% by weight, or, in some cases, 12 to 18% by weight, based on the total weight of the isocyanate-reactive composition. In certain implementations, the saccharide-initiated polyether polyol is present in an amount such that the ratio, by weight, of aromatic polyester polyol to saccharide-initiated polyether polyol in the polyol composition is at least 2:1, such as 2.0:1.0 to 20.0:1.0, 2.0:1.0 to 10.0:1.0 or, in some cases, 2.0:1.0 to 5.0:1.0. In some implementations, the saccharide-initiated polyether polyol is present in an amount such that the ratio, by weight, of saccharide-initiated polyether polyol to amine-initiated, such as alkanolamine-initiated, polyether polyol in the polyol composition is at least 2:1, such as 2.0:1.0 to 20.0:1.0, 2.0:1.0 to 10.0:1.0 or 4.0:1.0 to 6.0:1.0.

In addition, in some implementations, the polyol composition comprises a relatively low-functionality polyether polyol, such as those having a hydroxyl functionality of less than 4.0. Such low-functionality polyether polyols are produced using relatively low functionality starters, such as glycols (such as propylene glycol and diethylene glycol) and glycerin, among others, as well as mixtures thereof any two or more thereof. In some implementations, the low-functionality polyether polyol has an OH number of from 200 to 600 mg KOH/g, such as 300 to 550 mg KOH/g, such as 400 to 500 mg KOH/g, or, in some cases, 450 to 500 mg KOH/g, and a functionality of more than 2 to less than 4.0, such as 2.5 to 3.5 or 2.8 to 3.2.

In some implementations, the low-functionality polyether polyol is present in an amount of 1 to 40% by weight, such as 1 to 20% by weight, or, in some cases, 5 to 15% by weight, based on the total weight of the polyol composition. In some implementations, the low-functionality polyether polyol is present in an amount of 1 to 30% by weight, such as 1 to 10% by weight, or, in some cases, 5 to 10% by weight, based on the total weight of the isocyanate-reactive composition. In certain implementations, the low-functionality polyether polyol is present in an amount such that the ratio, by weight, of aromatic polyester polyol to low-functionality polyether polyol in the polyol composition is at least 2:1, such as 2.0:1.0 to 20.0:1.0, 2.0:1.0 to 10.0:1.0 or, in some cases, 5.0:1.0 to 10.0:1.0. In some implementations, the low-functionality polyether polyol is present in an amount such that the ratio, by weight, of low-functionality polyether polyol to amine-initiated, such as alkanolamine-initiated, polyether polyol in the polyol composition is at least 1.5:1, such as 2.0:1.0 to 10.0:1.0, 2.0:1.0 to 5.0:1.0 or 2.0:1.0 to 3.0:1.0.

If desired, the polyol composition may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, and diethyltoluenediamine.

In certain implementations, the polyol composition has a weighted average functionality of 2 to 4, such as 2 to 3 or 2.5 to 3.0, and/or a weighted average hydroxyl number of 300 to 500 mg KOH/g, such as 300 to 400 mg KOH/g.

In certain implementations, the polyol composition comprises less than 20% by weight, less than 10% by weight, less than 5% by weight, or, in some cases, less than 1% by weight, of ethylene oxide, based on the total weight of polyether polyol that is present in the polyol composition.

As indicated earlier, the isocyanate-reactive compositions of this specification further comprise a blowing agent composition. The blowing agent composition comprises: (1) a physical blowing agent comprising HFO; and (2) water.

Suitable HFOs include, for example, pentafluoropropane, tetrafluoropropene, 2,3,3,3-tetrafluoropropene, 1,2,3,3-tetrafluoropropene, 1,3,3,3-tetrafluoropropene (such as trans-1,3,3,3-tetrafluoroprop-1-ene), trifluoropropene, tetrafluorobutene, pentafluorobutene, hexafluorobutene, heptafluorobutene, heptafluoropentene, octafluoropentene, and nonafluoropentene, as well as HCFOs, such as 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers).

In some implementations, the HFO, such as 1,3,3,3-tetrafluoropropene and/or 1-chloro-3,3,3-trifluoropropene, is present in an amount of at least 10% by weight, such as 10 to 30% by weight or 10 to 20% by weight, based on the total weight of the isocyanate-reactive composition.

In certain implementations, the isocyanate-reactive composition comprises one or more other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane), etc. In other embodiments, however, the isocyanate-reactive composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane (i.e. 2-methylbutane). As used herein, the term "substantially free" when used with reference to these blowing agents, means that the blowing agent is present, if at all, in an amount of less than 10% by weight, such as less than 1% by weight, based on the total weight of the blowing agent composition.

As indicated above, the blowing agent composition comprises water. In some of these implementations, the water is present in an amount of from 0.5 to 5.0% by weight, such as 1 to 4% by weight, or 1.0 to 3.0% by weight, or 1.0 to 2.0% by weight, based on the total weight of the isocyanate-reactive composition.

In certain implementations, the blowing agent composition comprises HFO and water, wherein the HFO and water are present in an amount of at least 90% by weight, such as at least 95% by weight, or, in some cases, at least 99% by weight, based on the total weight of the blowing agent composition. In certain implementations, HFO and water are present in the blowing agent composition at a weight ratio of at least 2:1, such as at least 5:1, 5:1 to 15:1 or 8:1 to 12:1.

In some implementations, the isocyanate-reactive composition also comprises a surfactant. Any suitable surfactant can be used, including organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some implementations, surfactant is present in an amount of 0.2 to 5.0% by weight, such as 1 to 3% by weight, based on the total weight of the isocyanate-reactive composition.

As indicated earlier, the isocyanate-reactive composition further comprises a catalyst composition. Specifically, the catalyst composition comprises: (1) a morpholine; (2) an imidazole; (3) a quaternary ammonium carboxylate; and (4) a metal carboxylate.

Suitable morpholine catalysts include, for example, dimorpholinodiethylether, dimorpholinodimethylether, N-ethylmorpholine, and N-methylmorpholine. Suitable imidazole catalysts include, for example, imidazole, n-methyl-imidazole, and 1,2-dimethylimidazole. In some implementations, morpholine and imidazole are present in a combined amount of less than 10% by weight, such as 4 to 8% by weight, or 5 to 6% by weight based on the total weight of the isocyanate-reactive composition. In some implementations, the morpholine is present in an amount of 80 to 99% or 90 to 95% by weight, based on the total combined weight of morpholine and imidazole, and the imidazole is present in an amount of 1 to 20% or 5 to 10% by weight, based on the total combined weight of the morpholine and imidazole.

In some implementations, the isocyanate-reactive composition are substantially or, in some cases, completely free of other amine catalysts. As used herein, the term "substantially free", when used with reference to the absence of a catalyst, means that the catalyst is present in an amount of no more than 0.1% by weight, based on the total weight of the isocyanate-reactive composition.

The catalyst composition also comprises a quaternary ammonium carboxylate. Suitable quaternary ammonium carboxylates include, for example, (2-hydroxypropyl)trimethylammonium 2-ethylhexanoate (Dabco® TMR from Evonik Industries) and (2-hydroxypropyl)trimethylammonium formate (Dabco® TMR-2 from Evonik Industries). In some implementations, the quaternary ammonium carboxylate is present in the isocyanate-reactive composition in an amount of from 0.5 to 2.0% by weight, such as 0.5 to 1% by weight, based on the total weight of the isocyanate-reactive composition.

The catalyst composition also comprises a metal carboxylate. Suitable metal carboxylates include, for example, potassium carboxylates, such as potassium octoate, potassium acetate, and potassium lactate.

More specifically, in some implementations, the metal carboxylate and the quaternary ammonium carboxylate are present in the catalyst composition in a relative weight ratio of metal carboxylate to quaternary ammonium carboxylate of greater than 1:1, such as 1:1 to 3:1, or 1.5:1 to 2.5:1.

In some implementations, the morpholine is present in the catalyst composition in an amount of at least 50% by weight, such as 50% to 80% by weight, or 50% to 70% by weight, based on the total combined weight of morpholine, imidazole, quaternary ammonium carboxylate and metal carboxylate. In some implementations, the imidazole is present in the catalyst composition in an amount of 1 to 10% by weight, such as 1% to 50% by weight, or 2% to 4% by weight, based on the total combined weight of morpholine, imidazole, quaternary ammonium carboxylate and metal carboxylate. In some implementations, the quaternary ammonium carboxylate is present in the catalyst composition in an amount of 1 to 20% by weight, such as 5% to 10% by weight, or 8% to 12% by weight, based on the total combined weight of morpholine, imidazole, quaternary ammonium carboxylate and metal carboxylate. In some implementations, the metal carboxylate is present in the catalyst composition in an amount of at least 10% by weight, such as 10% to 40% by weight, or 20% to 30% by weight, based on the total combined weight of morpholine, imidazole, quaternary ammonium carboxylate and metal carboxylate.

In some implementations, the catalyst composition is present in an amount of 2% to 20% by weight, such as 5% to 15% by weight, or 6% to 10% by weight, based on the total weight of the isocyanate-reactive composition.

Additional materials which may optionally be included in the foam-forming compositions include: pigments, colorants, fillers, antioxidants, flame retardants, and stabilizers. Exemplary flame retardants useful in the foam-forming compositions include, but are not limited to, reactive bromine based compounds known to be used in polyurethane chemistry and chlorinated phosphate esters, including but not limited to, tetrabromophthalate diol (theoretical formula $C_{15}H_{16}O_7Br_4$), tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane-polyisocyanurate ("PUR-PIR") foams. In such processes, a polyisocyanate is reacted with an isocyanate-reactive composition of the type described above. In some implementations, the isocyanate functional component and the isocyanate-reactive composition are mixed at an isocyanate index of from 90 to 180, such as 120 to 180, or in some cases, 140 to 160.

In certain implementations, the polyol composition of the isocyanate-reactive composition is reacted with a polyisocyanate in the presence of the blowing agent composition, the catalyst composition, a surfactant and any other optional ingredients. The rigid foams may be prepared by blending all of the components of the isocyanate reactive composition together in a phase stable mixture, and then mixing this in the proper ratio with the polyisocyanate. Alternatively, one or more of the components, such as the surfactant, may be combined with the polyisocyanate prior to mixing it with the isocyanate reactive component. Other possible implementations would include adding one or more of the components as a separate stream, together with the isocyanate reactive component and polyisocyanate. As used herein, the term phase stable means that the isocyanate-reactive composition will not separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol composition, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the foam-forming mixture, but requires that the isocyanate-reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, and surfactants. Other additives may be added to either the isocyanate prepolymer or remaining polyol or both prior to the mixing of the components, whereby at the end of the reaction, rigid foam is provided.

Furthermore, the rigid foam can be prepared in a batch or continuous process by the one-shot or quasi-prepolymer methods using any well-known foaming apparatus. The rigid foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid foam. Thus, high closed-cell content in the foam is desirable. Foams produced according to implementations of the present specification have more than 80 percent, typically more than 85 percent, or more than 88 percent closed-cell content as measured according to ASTM D6226-15.

This specification also relates to the use of the rigid foams described herein for thermal insulation. That is, the rigid foams of the present specification may find use as an insulating material in insulated sandwich panel apparatuses. The rigid foams can be used, for example, as an intermediate layer in composite elements or for filling hollow spaces of refrigerators, freezers, garage or entry doors, or trailer floors, walls, and roofs. The foams may also find use in the construction industry or for thermal insulation of long-distance heating pipes and containers.

As such, this specification also provides a composite article comprising rigid foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the apparatus may be a garage or entry door, and the composite article may include the foams produced according to this specification in sandwich composites for trailer walls, roofs, and floors.

The particular isocyanate-reactive compositions described herein can be particularly suitable for use in continuous open pour applications, such as is often used in the production of continuous panels or doors, such as garage doors. As will be appreciated, in such a continuous process, the reaction mixture (the mixture of the isocyanate-reactive component and the isocyanate-functional component) is continuously poured onto a moving bottom facer, and the moving top facer is applied at the entrance of the laminator mouth entering a continuously moving mold, where the facers can be a metal sheet, paper, cardboard, foil, or a plastic. The foam adheres to the facers as it reacts and cures. The resulting faced panel then exits from the laminator moving mold. To be effectively used in such a process, the reaction mixture must exhibit the right level of reactivity (sufficient to allow for adequate flow of the mixture) resulting from an ideal balance of blow and gel reactivity. As a result, certain implementations of this specification are directed to the use of the reaction mixtures described herein in such a process.

It was discovered, surprisingly, that certain isocyanate-reactive compositions described herein, while having a long shelf life, can produce flame retardant rigid PUR-PIR foams having a good combination of physical properties, such as green strength, while employing either a gaseous HFO blowing agent or a liquid HFO blowing agent.

Various aspects of the subject matter described herein are set out in the following numbered clauses:

Clause 1. An isocyanate-reactive composition comprising: (a) a polyol composition comprising: (1) 50% to 90% by weight, based on total weight of the polyol composition, of an aromatic polyester polyol having a functionality of 1.5 to 2.5 and an OH number of 150 to 360 mg KOH/g; and (2) an amine-initiated polyether polyol having an OH number of more than 500 mg KOH/g and a functionality of 2.5 to 4; (b) a blowing agent composition comprising: (1) a hydrofluoroolefin; and (2) water; and (c) a catalyst composition comprising: (1) a morpholine; (2) an imidazole; (3) a quaternary ammonium carboxylate; and (4) a metal carboxylate.

Clause 2. The isocyanate-reactive composition of clause 1, wherein the aromatic polyester polyol comprises a reaction product of an aromatic diacid or anhydride with a glycol and/or triol, such as a reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with phthalic acid, isophthalic acid, terephthalic acid, phthalic anhydride, or a mixture of any two or more thereof.

Clause 3. The isocyanate-reactive composition of clause 1 or clause 2, wherein the aromatic polyester polyol has an OH number of 200 to 335 mg KOH/g or 200 to 250 mg KOH/g and/or a functionality of 1.8 to less than 2.5, 1.8 to 2.2 or 1.9 to 2.1.

Clause 4. The isocyanate-reactive compositions of one of clause 1 to clause 3, wherein the aromatic polyester polyol is present in an amount of 50 to 80% by weight, 60 to 80% by weight, or 60 to 70% by weight, based on the total weight of the polyol composition that is in the isocyanate-reactive composition.

Clause 5. The isocyanate-reactive composition of one of clause 1 to clause 4, wherein the aromatic polyester polyol present in an amount of 30 to 50% by weight, 35 to 50% by weight, or 40 to 50% by weight, based on total weight of the isocyanate-reactive composition.

Clause 6. The isocyanate-reactive composition of one of clause 1 to clause 5, wherein the amine-initiated polyether polyol comprises an aromatic amine-initiated polyether polyol.

Clause 7. The isocyanate-reactive composition of clause 6, wherein the aromatic amine-initiated polyether polyol comprises a polyether polyol that is the reaction product of an H-functional starter comprising an aromatic amine and alkylene oxide, wherein the aromatic amine comprises a mixture of 2,3-TDA and 3,4-TDA and the alkylene oxide comprises ethylene oxide, propylene oxide, butylene oxide, amylene oxide or a mixture thereof.

Clause 8. The isocyanate-reactive composition of clause 7, wherein (i) aromatic amine is present in an amount of more than 50% by weight, at least 80% by weight, at least 90% by weight, or 100% by weight, based on the total weight of H-functional starter used to produce the aromatic amine-initiated polyether polyol, and/or (ii) propylene oxide is present in an amount of more than 50% by weight, such as at least 80% by weight, at least 90% by weight, or 100% by weight, based on the total weight of alkylene oxide used to prepare the aromatic amine-initiated polyether polyol.

Clause 9. The isocyanate-reactive composition of clause 8, wherein ethylene oxide is used in an amount of no more than 10% by weight, no more than 5% by weight, no more than 1% by weight, or 0% by weight, based on the total weight of alkylene oxide used to prepare the aromatic amine-initiated polyether polyol.

Clause 10. The isocyanate-reactive composition of one of clause 1 to clause 9, wherein the amine-initiated polyol comprises an alkanolamine-initiated polyether polyol comprising a reaction product of an alkylene oxide with an H-functional starter comprising one or more alkanolamines.

Clause 11. The isocyanate-reactive composition of clause 10, wherein the alkanolamine comprises a compound represented by the formula: $NH_2$—Z—OH, in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms, such as those represented by the formula: —R—O—R—, in which each R represents a hydrocarbon radical having 2 to 3 carbon atoms, such as where the alkanolamine comprises monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, or a mixture of any two or more thereof.

Clause 12. The isocyanate-reactive composition of clause 10 or clause 11, wherein the alkylene oxide used to prepare the alkanolamine-initiated polyether polyol comprises ethylene oxide, propylene oxide, butylene oxide, styrene oxide, and epichlorohydrin, or a mixture of any two or more thereof.

Clause 13. The isocyanate-reactive composition of one of clause 1 to clause 12, wherein the amine-initiated, such as alkanolamine-initiated, polyether polyol has an OH number of more than 500 mg KOH/g to 900 mg KOH/g, 600 to 800 mg KOH/g, or 680 to 720 mg KOH/g, and/or a functionality of 2.5 to 3.5.

Clause 14. The isocyanate-reactive composition of one of clause 1 to clause 13, wherein the amine-initiated, such as alkanolamine-initiated, polyether polyol is present in an amount of 0.1 to 10% by weight, 1 to 10% by weight or 2 to 6% by weight, based upon the total weight of the polyol composition that is in the isocyanate-reactive composition.

Clause 15. The isocyanate-reactive composition of one of clause 1 to clause 14, wherein the amine-initiated, such as alkanolamine-initiated, polyether polyol is present in an amount of 0.1 to 10% by weight, 0.1 to 5% by weight, or, in some cases 1 to 5% by weight, based on the total weight of the isocyanate-reactive composition.

Clause 16. The isocyanate-reactive composition of one of clause 1 to clause 15, wherein the aromatic polyester polyol and the amine-initiated, such as alkanolamine-initiated, polyether polyol are present in the polyol composition in a weight ratio of at least 10:1, 10:1 to 50:1, 10:1 to 30:1 or 10:1 to 20:1.

Clause 17. The isocyanate-reactive composition of one of clause 1 to clause 16, wherein the polyol composition further comprises a polyether polyol having a hydroxyl functionality of more than 4.0, such as a saccharide-initiated polyether polyol comprising a reaction product of an alkylene oxide and an H-functional starter compound comprising a saccharide, such as where the alkylene oxide comprises ethylene oxide, propylene oxide, butylene oxide, styrene oxide, epichlorohydrin, or a mixture of any two or more thereof and/or the saccharide initiators comprises sucrose, sorbitol, maltitol, or a mixture thereof.

Clause 18. The isocyanate-reactive composition of clause 17, wherein the polyether polyol having a hydroxyl functionality of more than 4.0, such as the saccharide initiated polyether polyol, has an OH number of 200 to 600 mg KOH/g, 300 to 550 mg KOH/g, 400 to 500 mg KOH/g, or 450 to 500 mg KOH/g and/or a functionality of more than 4.0 to 6, 5 to 6, 5.2 to 5.8, or 5.2 to 5.4.

Clause 19. The isocyanate-reactive composition of clause 17 or clause 18, wherein the polyether polyol having a hydroxyl functionality of more than 4.0, such as the saccharide-initiated polyether polyol, is present in an amount of 1 to 40% by weight, 10 to 30% by weight, or 15 to 25% by weight, based on the total weight of the polyol composition.

Clause 20. The isocyanate-reactive composition of one of clause 17 to clause 19, wherein the polyether polyol having a hydroxyl functionality of more than 4.0, such as the saccharide-initiated polyether polyol, is present in an amount of 1 to 30% by weight, 10 to 20% by weight, or 12 to 18% by weight, based on the total weight of the isocyanate-reactive composition.

Clause 21. The isocyanate-reactive composition of one of clause 17 to clause 20, wherein the polyether polyol having a hydroxyl functionality of more than 4.0, such as the saccharide-initiated polyether polyol, is present in an amount such that the ratio, by weight, of aromatic polyester polyol to polyether polyol having a hydroxyl functionality of more than 4.0 in the polyol composition is at least 2:1, 2.0:1.0 to 20.0:1.0, 2.0:1.0 to 10.0:1.0 or 2.0:1.0 to 5.0:1.0.

Clause 22. The isocyanate-reactive composition of one of clause 17 to clause 21, wherein the polyether polyol having a hydroxyl functionality of more than 4.0, such as the saccharide-initiated polyether polyol, is present in an amount such that the ratio, by weight, of polyether polyol having a hydroxyl functionality of more than 4.0 to amine-initiated, such as alkanolamine-initiated, polyether polyol in the polyol composition is at least 2:1, 2.0:1.0 to 20.0:1.0, 2.0:1.0 to 10.0:1.0 or 4.0:1.0 to 6.0:1.0.

Clause 23. The isocyanate-reactive composition of one of clause 1 to clause 22, wherein the polyol composition further comprises a low-functionality polyether polyol having a hydroxyl functionality of less than 4.0, such as those that are a reaction product of a glycol, such as propylene glycol and diethylene glycol, glycerin, or a mixture thereof.

Clause 24. The isocyanate-reactive composition of clause 23, wherein the low-functionality polyether polyol has an OH number of from 200 to 600 mg KOH/g, 300 to 550 mg KOH/g, 400 to 500 mg KOH/g, or 450 to 500 mg KOH/g and/or a functionality of more than 2 to less than 4.0, 2.5 to 3.5 or 2.8 to 3.2.

Clause 25. The isocyanate-reactive composition of clause 23 or clause 24, wherein the low-functionality polyether polyol is present in an amount of 1 to 40% by weight, 1 to 20% by weight, or 5 to 15% by weight, based on the total weight of the polyol composition.

Clause 26. The isocyanate-reactive composition of one of clause 23 to clause 25, wherein the low-functionality polyether polyol is present in an amount of 1 to 30% by weight, 1 to 10% by weight, or 5 to 10% by weight, based on the total weight of the isocyanate-reactive composition.

Clause 27. The isocyanate-reactive composition of one of clause 23 to clause 26, wherein the low-functionality polyether polyol is present in an amount such that the ratio, by weight, of aromatic polyester polyol to low-functionality polyether polyol in the polyol composition is at least 2:1, 2.0:1.0 to 20.0:1.0, 2.0:1.0 to 10.0:1.0 or 5.0:1.0 to 10.0:1.0.

Clause 28. The isocyanate-reactive composition of one of clause 23 to clause 27, wherein the low-functionality polyether polyol is present in an amount such that the ratio, by weight, of low-functionality polyether polyol to amine-initiated, such as alkanolamine-initiated, polyether polyol in the polyol composition is at least 1.5:1, 2.0:1.0 to 10.0:1.0, 2.0:1.0 to 5.0:1.0 or 2.0:1.0 to 3.0:1.0.

Clause 29. The isocyanate-reactive composition of one of clause 1 to clause 28, wherein the polyol composition has a weighted average functionality of 2 to 4, 2 to 3 or 2.5 to 3.0 and/or a weighted average hydroxyl number of 300 to 500 mg KOH/g or 300 to 400 mg KOH/g.

Clause 30. The isocyanate-reactive composition of one of clause 1 to clause 29, wherein the polyol composition comprises less than 20% by weight, less than 10% a by weight, less than 5% by weight, or less than 1% by weight of ethylene oxide, based on the total weight of polyether polyol that is present in the polyol composition.

Clause 31. The isocyanate-reactive composition of one of clause 1 to clause 30, wherein the HFO comprises 1,3,3,3-tetrafluoropropene and/or 1-chloro-3,3,3-trifluoropropene that is present in an amount of at least 10% by weight, 10 to 30% by weight or 10 to 20% by weight, based on the total weight of the isocyanate-reactive composition.

Clause 32. The isocyanate-reactive composition of one of clause 1 to clause 31, wherein the isocyanate-reactive composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane.

Clause 33. The isocyanate-reactive composition of one of clause 1 to clause 32, wherein the water is present in an amount of from 0.5 to 5.0% by weight, 1 to 4% by weight, 1.0 to 3.0% by weight, or 1.0 to 2.0% by weight, based on the total weight of the isocyanate-reactive composition.

Clause 34. The isocyanate-reactive composition of one of clause 1 to clause 33, wherein the HFO and water are present in an amount of at least 90% by weight, at least 95% by weight, or at least 99% by weight, based on the total weight of the blowing agent composition.

Clause 35. The isocyanate-reactive composition of one of clause 1 to clause 34, wherein the HFO and water are present in the blowing agent composition at a weight ratio of at least 2:1, at least 5:1, 5:1 to 15:1 or 8:1 to 12:1.

Clause 36. The isocyanate-reactive composition of one of clause 1 to clause 34, further comprising a surfactant, such as a polysiloxane-polyalkyene-block copolymer, such as a polyether-modified polysiloxane.

Clause 37. The isocyanate-reactive composition of one of clause 1 to clause 35, wherein the morpholine comprises dimorpholinodiethylether, dimorpholinodimethylether, N-ethylmorpholine, N-methylmorpholine, or a mixture of any two or more thereof.

Clause 38. The isocyanate-reactive composition of one of clause 1 to clause 37, wherein the imidazole comprises imidazole, n-methylimidazole, 1,2-dimethylimidazole, or a mixture of any two or more thereof.

Clause 39. The isocyanate-reactive composition of one of clause 1 to clause 38, wherein the morpholine and imidazole are present in a combined amount of less than 10% by weight, 4 to 8% by weight, or 5 to 6% by weight based on the total weight of the isocyanate-reactive composition.

Clause 40. The isocyanate-reactive composition of one of clause 1 to clause 39, wherein the morpholine is present in an amount of 80 to 99% or 90 to 95% by weight, based on the total combined weight of morpholine and imidazole and the imidazole is present in an amount of 1 to 20% or 5 to 10% by weight, based on the total combined weight of the morpholine and imidazole.

Clause 41. The isocyanate-reactive composition of one of clause 1 to clause 40, wherein the isocyanate-reactive composition is substantially or completely free of other amine catalysts.

Clause 42. The isocyanate-reactive composition of one of clause 1 to clause 41, wherein the quaternary ammonium carboxylate comprises (2-hydroxypropyl)trimethylammonium 2-ethylhexanoate, (2-hydroxypropyl)trimethylammonium formate, or a mixture of any two or more thereof.

Clause 43. The isocyanate-reactive composition of one of clause 1 to clause 42, wherein the quaternary ammonium carboxylate is present in the isocyanate-reactive composition in an amount of 0.5 to 2.0% by weight or 0.5 to 1% by weight, based on the total weight of the isocyanate-reactive composition.

Clause 44. The isocyanate-reactive composition of one of clause 1 to clause 43, wherein the metal carboxylate comprises a potassium carboxylate, such as potassium octoate, potassium acetate, and potassium lactate.

Clause 45. The isocyanate-reactive composition of one of clause 1 to clause 44, wherein the metal carboxylate and the quaternary ammonium carboxylate are present in the catalyst composition in a relative weight ratio of metal carboxylate to quaternary ammonium carboxylate of greater than 1:1, 1:1 to 3:1, or 1.5:1 to 2.5:1.

Clause 46. The isocyanate-reactive composition of one of clause 1 to clause 45, wherein the morpholine is present in the catalyst composition in an amount of at least 50% by weight, 50% to 80% by weight, or 50% to 70% by weight, based on the total combined weight of morpholine, imidazole, quaternary ammonium carboxylate and metal carboxylate.

Clause 47. The isocyanate-reactive composition of one of clause 1 to clause 46, wherein the imidazole is present in the catalyst composition in an amount of 1 to 10% by weight, 1% to 5% by weight, or 2% to 4% by weight, based on the total combined weight of morpholine, imidazole, quaternary ammonium carboxylate and metal carboxylate.

Clause 48. The isocyanate-reactive composition of one of clause 1 to clause 47, wherein the quaternary ammonium carboxylate is present in the catalyst composition in an amount of 1 to 20% by weight, 5% to 10% by weight, or 8% to 12% by weight, based on the total combined weight of morpholine, imidazole, quaternary ammonium carboxylate and metal carboxylate.

Clause 49. The isocyanate-reactive composition of one of clause 1 to clause 48, wherein the metal carboxylate is present in the catalyst composition in an amount of at least 10% by weight, 10% to 40% by weight, or 20% to 30% by weight, based on the total combined weight of morpholine, imidazole, quaternary ammonium carboxylate and metal carboxylate.

Clause 50. The isocyanate-reactive composition of one of clause 1 to clause 49, wherein the catalyst composition is present in an amount of 2% to 20% by weight, 5% to 15% by weight, or 6% to 10% by weight, based on the total weight of the isocyanate-reactive composition.

Clause 51. A process for producing a rigid polyurethane-polyisocyanurate foam comprising mixing a polyisocyanate with the isocyanate-reactive composition of one of clause 1 to clause 50 at an isocyanate index of 90 to 180, 120 to 180, or 140 to 160.

Clause 52. The process of clause 51, comprising pouring the reaction mixture (the mixture of the isocyanate-reactive component and the isocyanate-functional component) into a cavity of a mold of a desired part, in which the cavity is lined with a facer, which can be a metal sheet, particle board, plaster board, fiber cement, or a plastic.

Clause 53. A rigid polyurethane-polyisocyanurate foam produced by the process of clause 51 or clause 52 having a closed-cell content of more than 80 percent, more than 85 percent, or more than 88 percent, as measured according to ASTM D6226-15.

Clause 54. A composite article comprising the rigid foam of clause 53 sandwiched between facer substrates, such as a facer substrate constructed of plastic (such a polypropylene resin reinforced with continuous bi-directional glass fibers or a fiberglass reinforced polyester copolymer), paper, wood, or metal.

Clause 55. A foam-forming composition comprising: (a) a polyol composition comprising: (1) 50% to 90% by weight, based on total weight of the polyol composition, of an aromatic polyester polyol having a functionality of 1.5 to 2.5 and an OH number of 150 to 360 mg KOH/g; and (2) an amine-initiated polyether polyol having an OH number of more than 500 mg KOH/g and a functionality of 2.5 to 4; (b) a blowing agent composition comprising: (1) a hydrofluoroolefin; and (2) water; (c) a catalyst composition comprising: (1) a morpholine; (2) an imidazole; (3) a quaternary ammonium carboxylate; and (4) a metal carboxylate; and (d) a polyisocyanate in an amount sufficient to provide an isocyanate index of 90 to 180, 120 to 180, or 140 to 160.

Clause 56. The foam-forming composition of clause 55, wherein the aromatic polyester polyol comprises a reaction product of an aromatic diacid or anhydride with a glycol and/or triol, such as a reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with phthalic acid, isophthalic acid, terephthalic acid, phthalic anhydride, or a mixture of any two or more thereof.

Clause 57. The foam-forming composition of clause 55 or clause 56, wherein the aromatic polyester polyol has an OH number of 200 to 335 mg KOH/g or 200 to 250 mg KOH/g and/or a functionality of 1.8 to less than 2.5, 1.8 to 2.2 or 1.9 to 2.1.

Clause 58. The foam-forming compositions of one of clause 55 to clause 57, wherein the aromatic polyester polyol is present in an amount of 50 to 80% by weight, 60 to 80% by weight, or 60 to 70% by weight, based on the total weight of the polyol composition that is in the foam-forming composition.

Clause 59. The foam-forming composition of one of clause 55 to clause 58, wherein the aromatic polyester polyol present in an amount of 30 to 50% by weight, 35 to 50/by weight, or 40 to 50% by weight, based on total weight of the foam-forming composition except for the weight of the polyisocyanate.

Clause 60. The foam-forming composition of one of clause 55 to clause 59, wherein the amine-initiated polyether polyol comprises an aromatic amine-initiated polyether polyol.

Clause 61. The foam-forming composition of clause 60, wherein the aromatic amine-initiated polyether polyol comprises a polyether polyol that is the reaction product of an H-functional starter comprising an aromatic amine and alkylene oxide, wherein the aromatic amine comprises a mixture of 2,3-TDA and 3,4-TDA and the alkylene oxide comprises ethylene oxide, propylene oxide, butylene oxide, amylene oxide or a mixture thereof.

Clause 62. The foam-forming composition of clause 61, wherein (i) aromatic amine is present in an amount of more than 50% by weight, at least 80% by weight, at least 90% by weight, or 100% by weight, based on the total weight of H-functional starter used to produce the aromatic amine-initiated polyether polyol, and/or (ii) propylene oxide is present in an amount of more than 50% by weight, such as at least 80% by weight, at least 90% by weight, or 100% by weight, based on the total weight of alkylene oxide used to prepare the aromatic amine-initiated polyether polyol.

Clause 63. The foam-forming composition of clause 62, wherein ethylene oxide is used in an amount of no more than 10% by weight, no more than 5% by weight, no more than 1% by weight, or 0% by weight, based on the total weight of alkylene oxide used to prepare the aromatic amine-initiated polyether polyol.

Clause 64. The foam-forming composition of one of clause 55 to clause 63, wherein the amine-initiated polyol comprises an alkanolamine-initiated polyether polyol comprising a reaction product of an alkylene oxide with an H-functional starter comprising one or more alkanolamines.

Clause 65. The foam-forming composition of clause 64, wherein the alkanolamine comprises a compound represented by the formula: $NH_2$—Z-OH, in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms, such as those represented by the formula: —R—O—R—, in which each R represents a hydrocarbon radical having 2 to 3 carbon atoms, such as where the alkanolamine comprises monoethanolamine, 1-amino-2-propanol, 2-amino-1-propanol, 3-amino-1-propanol, 1-(2-aminoethoxy) ethanol, 1-amino-2-butanol, 2-amino-3-butanol, 2-amino-2-methylpropanol, 5-amino pentanol, 3-amino-2, 2-dimethyl propanol, 4-aminocyclohexanol, or a mixture of any two or more thereof.

Clause 66. The foam-forming composition of clause 64 or clause 65, wherein the alkylene oxide used to prepare the alkanolamine-initiated polyether polyol comprises ethylene oxide, propylene oxide, butylene oxide, styrene oxide, and epichlorohydrin, or a mixture of any two or more thereof.

Clause 67. The foam-forming composition of one of clause 55 to clause 66, wherein the amine-initiated, such as alkanolamine-initiated, polyether polyol has an OH number of more than 500 mg KOH/g to 900 mg KOH/g, 600 to 800 mg KOH/g, or 680 to 720 mg KOH/g, and/or a functionality of 2.5 to 3.5.

Clause 68. The foam-forming composition of one of clause 55 to clause 67, wherein the amine-initiated, such as alkanolamine-initiated, polyether polyol is present in an amount of 0.1 to 10% by weight, 1 to 10% by weight or 2 to 6% by weight, based upon the total weight of the polyol composition that is in the isocyanate-reactive composition.

Clause 69. The foam-forming composition of one of clause 55 to clause 68, wherein the amine-initiated, such as alkanolamine-initiated, polyether polyol is present in an amount of 0.1 to 10% by weight, 0.1 to 5% by weight, or, in some cases 1 to 5% by weight, based on the total weight of the foam-forming composition except for the weight of the polyisocyanate.

Clause 70. The foam-forming composition of one of clause 55 to clause 69, wherein the aromatic polyester polyol and the amine-initiated, such as alkanolamine-initiated, polyether polyol are present in the polyol composition in a weight ratio of at least 10:1, 10:1 to 50:1, 10:1 to 30:1 or 10:1 to 20:1.

Clause 71. The foam-forming composition of one of clause 55 to clause 70, wherein the polyol composition further comprises a polyether polyol having a hydroxyl functionality of more than 4.0, such as a saccharide-initiated polyether polyol comprising a reaction product of an alkylene oxide and an H-functional starter compound comprising a saccharide, such as where the alkylene oxide comprises ethylene oxide, propylene oxide, butylene oxide, styrene oxide, epichlorohydrin, or a mixture of any two or more thereof and/or the saccharide initiators comprises sucrose, sorbitol, maltitol, or a mixture thereof.

Clause 72. The foam-forming composition of clause 71, wherein the polyether polyol having a hydroxyl functionality of more than 4.0, such as the saccharide initiated polyether polyol, has an OH number of 200 to 600 mg KOH/g, 300 to 550 mg KOH/g, 400 to 500 mg KOH/g, or 450 to 500 mg KOH/g and/or a functionality of more than 4.0 to 6, 5 to 6, 5.2 to 5.8, or 5.2 to 5.4.

Clause 73. The foam-forming composition of clause 71 or clause 72, wherein the polyether polyol having a hydroxyl functionality of more than 4.0, such as the saccharide-initiated polyether polyol, is present in an amount of 1 to 40% by weight, 10 to 30% by weight, or 15 to 25% by weight, based on the total weight of the polyol composition that is in the foam-forming composition.

Clause 74. The foam-forming composition of one of clause 71 to clause 73, wherein the polyether polyol having a hydroxyl functionality of more than 4.0, such as the saccharide-initiated polyether polyol, is present in an amount of 1 to 30% by weight, 10 to 20% by weight, or 12 to 18% by weight, based on the total weight of the foam-forming composition except for the weight of the polyisocyanate.

Clause 75. The foam-forming composition of one of clause 71 to clause 74, wherein the polyether polyol having a hydroxyl functionality of more than 4.0, such as the saccharide-initiated polyether polyol, is present in an amount such that the ratio, by weight, of aromatic polyester polyol to polyether polyol having a hydroxyl functionality of more than 4.0 in the polyol composition is at least 2:1, 2.0:1.0 to 20.0:1.0, 2.0:1.0 to 10.0:1.0 or 2.0:1.0 to 5.0:1.0.

Clause 76. The foam-forming composition of one of clause 71 to clause 75, wherein the polyether polyol having a hydroxyl functionality of more than 4.0, such as the saccharide-initiated polyether polyol, is present in an amount such that the ratio, by weight, of polyether polyol having a hydroxyl functionality of more than 4.0 to amine-initiated, such as alkanolamine-initiated, polyether polyol in the polyol composition is at least 2:1, 2.0:1.0 to 20.0:1.0, 2.0:1.0 to 10.0:1.0 or 4.0:1.0 to 6.0:1.0.

Clause 77. The foam-forming composition of one of clause 55 to clause 76, wherein the polyol composition further comprises a low-functionality polyether polyol having a hydroxyl functionality of less than 4.0, such as those that are a reaction product of a glycol, such as propylene glycol and diethylene glycol, glycerin, or a mixture thereof.

Clause 78. The foam-forming composition of clause 77, wherein the low-functionality polyether polyol has an OH number of from 200 to 600 mg KOH/g, 300 to 550 mg KOH/g, 400 to 500 mg KOH/g, or 450 to 500 mg KOH/g and/or a functionality of more than 2 to less than 4.0, 2.5 to 3.5 or 2.8 to 3.2.

Clause 79. The foam-forming composition of clause 77 or clause 78, wherein the low-functionality polyether polyol is present in an amount of 1 to 40% by weight, 1 to 20% by weight, or 5 to 15% by weight, based on the total weight of the polyol composition that is in the foam-forming composition.

Clause 80. The foam-forming composition of one of clause 77 to clause 79, wherein the low-functionality polyether polyol is present in an amount of 1 to 30% by weight, 1 to 10% by weight, or 5 to 10% by weight, based on the total weight of the foam-forming composition except for the weight of the polyisocyanate.

Clause 81. The foam-forming composition of one of clause 77 to clause 80, wherein the low-functionality polyether polyol is present in an amount such that the ratio, by weight, of aromatic polyester polyol to low-functionality polyether polyol in the polyol composition is at least 2:1, 2.0:1.0 to 20.0:1.0, 2.0:1.0 to 10.0:1.0 or 5.0:1.0 to 10.0:1.0.

Clause 82. The foam-forming composition of one of clause 77 to clause 81, wherein the low-functionality polyether polyol is present in an amount such that the ratio, by weight, of low-functionality polyether polyol to amine-initiated, such as alkanolamine-initiated, polyether polyol in the polyol composition is at least 1.5:1, 2.0:1.0 to 10.0:1.0, 2.0:1.0 to 5.0:1.0 or 2.0:1.0 to 3.0:1.0.

Clause 83. The foam-forming composition of one of clause 55 to clause 82, wherein the polyol composition has a weighted average functionality of 2 to 4, 2 to 3 or 2.5 to 3.0 and/or a weighted average hydroxyl number of 300 to 500 mg KOH/g or 300 to 400 mg KOH/g.

Clause 84. The foam-forming composition of one of clause 55 to clause 83, wherein the polyol composition comprises less than 20% by weight, less than 10% by weight, less than 5% by weight, or less than 1% by weight of ethylene oxide, based on the total weight of polyether polyol that is present in the polyol composition.

Clause 85. The foam-forming composition of one of clause 55 to clause 84, wherein the HFO comprises 1,3,3,3-tetrafluoropropene and/or 1-chloro-3,3,3-trifluoropropene that is present in an amount of at least 10% by weight, 10 to 30% by weight or 10 to 20% by weight, based on the total weight of the foam-forming composition except for the weight of the polyisocyanate.

Clause 86. The foam-forming composition of one of clause 55 to clause 85, wherein the foam-forming composition is substantially or, in some cases, completely free, of other physical blowing agents, such as other halogenated blowing agents, such as CFCs, HCFCs, and/or HFCs and/or hydrocarbon blowing agents, such as butane, n-pentane, cyclopentane, hexane, and/or isopentane.

Clause 87. The foam-forming composition of one of clause 55 to clause 86, wherein the water is present in an amount of 0.5 to 5.0% by weight, 1 to 4% by weight, 1.0 to 3.0% by weight, or 1.0 to 2.0% by weight, based on the total weight of the foam-forming composition except for the weight of the polyisocyanate.

Clause 88. The isocyanate-reactive composition of one of clause 55 to clause 87, wherein the HFO and water are present in an amount of at least 90% by weight, at least 95% by weight, or at least 99% by weight, based on the total weight of the blowing agent composition.

Clause 89. The foam-forming composition of one of clause 55 to clause 88, wherein the HFO and water are present in the blowing agent composition at a weight ratio of at least 2:1, at least 5:1, 5:1 to 15:1 or 8:1 to 12:1.

Clause 90. The foam-forming composition of one of clause 55 to clause 89, further comprising a surfactant, such as a polysiloxane-polyalkyene-block copolymer, such as a polyether-modified polysiloxane.

Clause 91. The foam-forming composition of one of clause 55 to clause 90, wherein the morpholine comprises dimorpholinodiethylether, dimorpholinodimethylether, N-ethylmorpholine, N-methylmorpholine, or a mixture of any two or more thereof.

Clause 92. The foam-forming composition of one of clause 55 to clause 91, wherein the imidazole comprises imidazole, n-methylimidazole, 1,2-dimethylimidazole, or a mixture of any two or more thereof.

Clause 93. The foam-forming composition of one of clause 55 to clause 92, wherein the morpholine and imidazole are present in a combined amount of less than 10% by weight, 4 to 8% by weight, or 5 to 6% by weight based on the total weight of the foam-forming composition except the weight of the polyisocyanate.

Clause 94. The foam-forming composition of one of clause 55 to clause 93, wherein the morpholine is present in an amount of 80 to 99% or 90 to 95% by weight, based on the total combined weight of morpholine and imidazole and the imidazole is present in an amount of 1 to 20% or 5 to 10% by weight, based on the total combined weight of the morpholine and imidazole.

Clause 95. The foam-forming composition of one of clause 55 to clause 94, wherein the foam-forming composition is substantially or completely free of other amine catalysts.

Clause 96. The foam-forming composition of one of clause 55 to clause 95, wherein the quaternary ammonium carboxylate comprises (2-hydroxypropyl)trimethylammonium 2-ethylhexanoate, (2-hydroxypropyl)trimethylammonium formate, or a mixture of any two or more thereof.

Clause 97. The foam-forming composition of one of clause 55 to clause 96, wherein the quaternary ammonium carboxylate is present in the isocyanate-reactive composition in an amount of 0.5 to 2.0% by weight or 0.5 to 1% by weight, based on the total weight of the foam-forming composition except for the weight of the polyisocyanate.

Clause 98. The foam-forming composition of one of clause 55 to clause 97, wherein the metal carboxylate comprises a potassium carboxylate, such as potassium octoate, potassium acetate, and potassium lactate.

Clause 99. The foam-forming composition of one of clause 55 to clause 98, wherein the metal carboxylate and the quaternary ammonium carboxylate are present in the catalyst composition in a relative weight ratio of metal carboxylate to quaternary ammonium carboxylate of greater than 1:1, 1:1 to 3:1, or 1.5:1 to 2.5:1.

Clause 100. The foam-forming composition of one of clause 55 to clause 99, wherein the morpholine is present in the catalyst composition in an amount of at least 50% by weight, 50% to 80% by weight, or 50% to 70% by weight, based on the total combined weight of morpholine, imidazole, quaternary ammonium carboxylate and metal carboxylate.

Clause 101. The foam-forming composition of one of clause 55 to clause 100, wherein the imidazole is present in the catalyst composition in an amount of 1 to 10% by weight, 1% to 5% by weight, or 2% to 4% by weight, based on the total combined weight of morpholine, imidazole, quaternary ammonium carboxylate and metal carboxylate.

Clause 102. The foam-forming composition of one of clause 55 to clause 101, wherein the quaternary ammonium carboxylate is present in the catalyst composition in an amount of 1 to 20% by weight, 5% to 10% by weight, or 8% to 12% by weight, based on the total combined weight of morpholine, imidazole, quaternary ammonium carboxylate and metal carboxylate.

Clause 103. The foam-forming composition of one of clause 55 to clause 102, wherein the metal carboxylate is present in the catalyst composition in an amount of at least 10% by weight, 10% to 40% by weight, or 20% to 30% by weight, based on the total combined weight of morpholine, imidazole, quaternary ammonium carboxylate and metal carboxylate.

Clause 104. The foam-forming composition of one of clause 55 to clause 103, wherein the catalyst composition is present in an amount of 2% to 20% by weight, 5% to 15% by weight, or 6% to 10% by weight, based on the total weight of the foam-forming composition except for the weight of the polyisocyanate.

Clause 105. The foam-forming composition of one of clause 55 to clause 104, wherein the polyisocyanate comprises m-phenylene diisocyanate, p-phenylene diisocyanate, 2,4-toluene diisocyanate, 2,6-toluene diisocyanate, a polymethylene polyphenyl-polyisocyanate, or a mixture thereof, such as where the polyisocyanate comprises a methylene-bridged polyphenyl polyisocyanate and/or a prepolymer of methylene-bridged polyphenyl polyisocyanate having an average functionality of from 1.8 to 3.5, such as from 2.0 to 3.1, isocyanate moieties per molecule and an NCO content of from 25 to 32 weight percent.

Clause 106. A rigid polyurethane-polyisocyanurate foam produced by the foam-forming composition of one of clause 55 to clause 105 having a closed-cell content of more than 80 percent, more than 85 percent, or more than 88 percent, as measured according to ASTM D6226-15.

Clause 107. A composite article comprising the rigid foam of clause 106 sandwiched between facer substrates, such as a facer substrate constructed of plastic (such a polypropylene resin reinforced with continuous bi-directional glass fibers or a fiberglass reinforced polyester copolymer), paper, wood, or metal.

The non-limiting and non-exhaustive examples that follow are intended to further describe various non-limiting and non-exhaustive implementations without restricting the scope of the implementations described in this specification.

Examples

Foam-forming compositions were prepared using the ingredients and amounts (in parts by weight) set forth in Table 1. The following materials were used:

POLYOL 1: an aromatic polyester polyol having an OH number of 240 mg KOH/g and a functionality of 2 that is commercially available from Stepan as Stepanpol® PS-2352;

POLYOL 2: a sucrose and water (83% by weight sucrose and 17% by weight water) initiated polyether polyol (100% propylene oxide as the alkylene oxide) having an OH number of 360-400 mg KOH/g and a functionality of 5.3;

POLYOL 3: an aromatic polyester polyol having an OH number of 225 to 245 mg KOH/g and a functionality of 2, commercially available from Invista as Terate® HT-5500;

POLYOL 4: a sucrose, propylene glycol, and water (82% by weight sucrose, 15% by weight propylene glycol and 3% by weight water) initiated polyether polyol (100% propylene oxide as the alkylene oxide) having an OH number of 450-490 mg KOH/g and a functionality of 5.2;

POLYOL 5: a monoethanolamine-initiated polyether polyol having an OH number of 685 to 715, a functionality of 3, and a nitrogen content of 5.8% by weight, prepared by propoxylating monoethanolamine;

POLYOL 6: a 2:1 weight ratio blend of POLYOL 4 and a glycerine-initiated polyether polyol (100% propylene oxide as the alkylene oxide) having an OH number of 450-490 mg KOH/g and a functionality of 3;

SURFACTANT 1: a non-hydrolysable polyether polydimethylsiloxane copolymer commercially available from Evonik under the trade name Tegostab® B8465;

SURFACTANT 2: a non-hydrolysable polyether polydimethylsiloxane copolymer commercially available from Evonik under the trade name Tegostab® B84725;

SURFACTANT 3: a non-hydrolysable polysiloxane polyether surfactant commercially available from Evonik under the trade name Tegostab® B8870;

SURFACTANT 4: an organo-silicone copolymer surfactant commercially available as Niax™ Silicone L-6972 from Momentive;

CATALYST 1: (2-hydroxypropyl)trimethylammonium formate commercially available as Dabco® TMR-2 from Evonik Industries;

CATALYST 2: 1,2-dimethylimidazole (DABCO® 2040 from Evonik);

CATALYST 3: 1,2-dimethylimidazole (DABCO® 2041 from Evonik);

CATALYST 4: 2,2'-dimorpholinodiethylether (JEFFCAT® DMDEE from Huntsman);

CATALYST 5: potassium carboxylate (DABCO® TMR-20 from Evonik);

CATALYST 6: bis(2-dimethylaminoethyl) ether (Niax™ A-1 from Momentive);

CATALYST 7: potassium octoate in diethylene glycol (DABCO® K-15 from Evonik);

ADDITIVE 1: alkyl phosphate flame retardant based on Tris(2-chloroisopropyl) phosphate commercially available from ICL Industrial Products as Fyrol® PCF;

ADDITIVE 2: a reactive bromine-containing diester/ether diol of tetrabromophthalic anhydride commercially available from Albemarle Corporation as Saytex® RB-79;

HFO LBA: trans-1,1,1-trifluoro-3-chloropropene, a hydrochlorofluoroolefin blowing agent which has a boiling point of 19° C. that is commercially available from Honeywell International Inc. as Solstice® LBA;

HFO GBA: trans-1,3,3,3-tetrafluoroprop-1-ene, which has a boiling point of −2.2° F. at 1 atm, commercially available from Honeywell International Inc. as Solstice® ze (R-1234ae); and ISOCYANATE: an aromatic polymeric isocyanate based on diphenylmethane-diisocyanate (MDI) with a minimum NCO content of 31% and a viscosity of 150 to 250 mPa·s at 25° C.

In each case a master batch was prepared by mixing the polyols, catalysts, surfactant, water and blowing agents in the amounts indicated in Table 1. Foams were prepared by mixing the masterbatch with the amount of isocyanate indicated in Table 1 and pouring the mixture into an 83 ounce paper cup. The cream time, gel time, tack-free time and free rise density (FRD) were recorded. Foams were prepared after initially preparing the master batch and also after aging the HFO GBA master batch for a minimum of 1 day at 60° C. to assess shelf life; or after aging the HFO LBA master batch for a minimum of 3 days at 60° C. to assess shelf life. Results are set forth in Table 1 (reported results represent the average results of three replicate experiments). N/A indicates that a representative sample was not tested.

Foams were also prepared using a high-pressure continuous laminator foam machine. The liquid output was maintained at a constant 26° C. for both Polyol and Isocyanate side with an output range of 113 to 166 grams/second. Foam was poured single stream onto a 30" wide by 2.0" thick, continuous length mold between paper, foil, or metal facers with a target density of 1.9 to 2.1 pcf (30.4 to 33.6 kg/m³). The laminator platens were maintained between 49° C. to 54° C. The foam remained between the laminator platens and was allowed to cure for 1.00 minute at 49-54° C. before removing. The resultant foam panels were then tested by an independent laboratory for ASTM E-84 classification. A 8"×8'×1" section of foam was sampled from the panels and used for k-factor testing according to ASTM C518.

Results can be seen in Table 1. Examples 6, 16 and 20 are the inventive examples.

TABLE 1

| Ingredient | Example | | | | | | | | |
| --- | --- | --- | --- | --- | --- | --- | --- | --- | --- |
| | 1 | 2 | 3 | 4 | 5 | 6 | 7 | 8 | 9 |
| POLYOL 1 | 51.54 | — | — | — | — | — | 52.47 | 51.79 | 53.73 |
| POLYOL 2 | 17.21 | — | — | — | — | — | 17.53 | 17.30 | 17.94 |
| POLYOL 3 | — | 59.28 | 59.28 | 59.28 | 58.25 | 44.71 | — | — | — |
| POLYOL 4 | — | 6.31 | 6.31 | 6.31 | 6.20 | — | — | — | — |
| POLYOL 5 | — | 2.98 | 2.98 | 2.98 | 2.93 | 2.95 | — | — | — |
| POLYOL 6 | — | — | — | — | — | 19.74 | — | — | — |
| SURFACTANT 1 | 2.12 | — | — | — | — | 2.10 | — | — | — |
| SURFACTANT 2 | — | 2.13 | 2.13 | 2.13 | 2.10 | — | — | — | — |

TABLE 1-continued

| Ingredient | | | | | | | | | |
|---|---|---|---|---|---|---|---|---|---|
| SURFACTANT 3 | — | — | — | — | — | — | — | — | — |
| SURFACTANT 4 | — | — | — | — | — | — | 2.15 | 2.12 | 2.16 |
| CATALYST 1 | 1.00 | 1.02 | 1.02 | 1.02 | 1.00 | 0.89 | — | 1.00 | 0.90 |
| CATALYST 2 | — | 1.02 | 1.02 | 1.02 | 1.00 | 0.30 | — | — | — |
| CATALYST 3 | — | — | — | — | — | — | 0.95 | 0.95 | 1.10 |
| CATALYST 4 | 6.00 | 4.07 | 4.07 | 4.07 | 4.00 | 4.92 | 6.00 | 6.00 | 2.00 |
| CATALYST 5 | 1.00 | 1.02 | 1.02 | 1.02 | 1.00 | 2.00 | — | 1.00 | 0.90 |
| CATALYST 6 | — | — | — | — | — | — | — | — | 0.30 |
| CATALYST 7 | — | — | — | — | — | — | 1.00 | — | — |
| ADDITIVE 1 | 3.50 | 5.29 | 5.29 | 5.29 | 5.20 | 5.20 | — | — | — |
| ADDITIVE 2 | — | 5.09 | 5.09 | 5.09 | 5.00 | 3.93 | 2.90 | 2.89 | 2.90 |
| Water | 1.25 | 1.79 | 1.79 | 1.79 | 1.76 | 1.70 | 1.08 | 1.20 | 1.37 |
| HFO LBA | 16.38 | — | — | — | 11.56 | 11.56 | 14.22 | 15.75 | 16.70 |
| HFO GBA | — | 10.00 | 10.00 | 10.00 | — | — | — | — | — |
| ISOCYANATE | 125.00 | 112.00 | 112.00 | 112.00 | 115.20 | 119.70 | 119.60 | 124.22 | 132.88 |
| Index | 1.92 | 1.46 | 1.43 | 1.43 | 1.49 | 1.48 | 1.91 | 1.86 | 1.88 |
| Gel time (before aging) | — | 19 | 19 | — | 19 to 20 | 24 | 21 | 19 | 18 |
| Gel time (after aging) | — | 20 | — | — | 19 | 25 | 23 | 19 | 18 |
| density (before aging) | — | 1.91 | 1.93 | — | 1.89 to 1.97 | — | 1.99 | 1.91 | 1.89 |
| density (after aging) | — | 1.93 | — | — | 1.91 | — | 2.00 | 1.89 | 1.84 |
| Mini burn rating (FSI/smoke) | 33/344 | 21/464 | — | 23/356 | 30/300 | — | 30/343 | 29/451 | 26/288 |
| foam green strength (mm)[1] | — | — | — | — | 28 | 17 | 12 | 12 | — |
| panel deflection (inches)[2] | — | — | — | — | 0.59 to 0.71 | 0.39 | 0.85 | 0.85 | — |
| Panel Bow Weight (lbs) | — | — | — | 72-80 | — | — | — | — | — |
| Blend shelf-life (days at 60° C. | 6 | 4 | — | 4 | — | — | 6 | 6 | — |
| 140° F. Oven (% vol. change) | — | 3.5 | 2.5 to 13.0 | −2.8 to 14.0 | — | — | — | 0.9 | — |
| E84 Result (FSI/smoke) | — | — | — | — | — | — | — | 40/130 | 55/185 |

| Ingredient | Example | | | | | | | | |
|---|---|---|---|---|---|---|---|---|---|
| | 10 | 11 | 12 | 13 | 14 | 15 | 16 | 17 | 18 |
| POLYOL 1 | 48.63 | 51.27 | 51.16 | — | — | — | — | 52.47 | 52.47 |
| POLYOL 2 | 18.04 | 17.12 | 17.24 | — | — | — | — | 17.53 | 17.53 |
| POLYOL 3 | — | — | — | 53.90 | 59.28 | 58.25 | 45.50 | — | — |
| POLYOL 4 | — | — | — | 10.00 | 6.31 | 6.20 | — | — | — |
| POLYOL 5 | 5.00 | — | — | 2.93 | 2.98 | 2.93 | 3.00 | — | — |
| POLYOL 6 | — | — | — | — | — | — | 20.10 | — | — |
| SURFACTANT 1 | — | 2.12 | 2.15 | — | — | — | — | — | — |
| SURFACTANT 2 | — | — | — | 2.10 | 2.13 | — | 2.13 | — | — |
| SURFACTANT 3 | — | — | — | — | — | 2.10 | — | — | — |
| SURFACTANT 4 | 2.16 | — | — | — | — | — | — | 2.15 | 2.15 |
| CATALYST 1 | 0.90 | 1.00 | 1.00 | 1.00 | 1.02 | 1.00 | 0.91 | 1.40 | 1.00 |
| CATALYST 2 | — | — | — | 1.00 | 1.02 | 1.00 | 0.31 | — | — |
| CATALYST 3 | 1.10 | 1.00 | 0.94 | — | — | — | — | 0.95 | 0.95 |
| CATALYST 4 | 2.00 | 6.00 | 6.00 | 4.00 | 4.07 | 4.00 | 5.00 | 6.00 | 6.00 |
| CATALYST 5 | 0.90 | 1.00 | 1.00 | 1.30 | 1.02 | 1.00 | 2.03 | — | — |
| CATALYST 6 | 0.30 | — | — | 0.25 | — | — | — | — | — |
| CATALYST 7 | — | — | — | — | — | — | — | — | — |
| ADDITIVE 1 | — | 3.50 | 2.89 | 5.20 | 5.29 | 5.20 | 5.29 | 2.90 | 2.90 |
| ADDITIVE 2 | 2.90 | — | — | 5.00 | 5.09 | 5.00 | 4.00 | — | — |
| Water | 1.37 | 1.24 | 1.24 | 1.76 | 1.79 | 1.76 | 1.73 | 1.20 | 1.20 |
| HFO LBA | 16.70 | 15.75 | 16.38 | 11.56 | — | 11.56 | — | 15.80 | 15.80 |
| HFO GBA | — | — | — | — | 10.00 | — | 10.00 | — | — |
| ISOCYANATE | 134.00 | 125.55 | 124.36 | 117.97 | 112.00 | 112.05 | 121.04 | 124.73 | 123.89 |
| Index | 1.76 | 1.94 | 1.92 | 1.53 | 1.43 | 1.53 | 1.48 | 1.91 | 1.91 |
| Gel time (before aging) | 18 | — | — | — | 21 | 20 | 22 | 18 to 19 | 24 |
| Gel time (after aging) | — | — | — | — | — | — | 23 to 24 | 20 | 26 |
| density (before aging) | 1.83 | — | — | — | 1.91 to 1.93 | 1.89 to 1.97 | 1.88 | 2.00 | 2.00 |
| density (after aging) | — | — | — | — | — | — | 1.84 | 2.03 | 2.03 |
| Mini burn rating (FSI/smoke) | 29/350 | — | — | — | 32/273 | 27/414 | 23/356 | 30/367 | — |
| foam green strength (mm) | — | 12 | 12 | 28 | — | 28 | 16 to 19 | — | — |
| panel deflection (inches) | — | 0.85 | 0.85 | — | — | 0.43 to 0.54 | 0.36-0.43 | — | — |
| Panel Bow Weight (lbs) | — | 85 | 85 | — | — | — | 83-90 | — | — |
| Blend shelf-life (days at 60° C. | — | 6 | 6 | — | — | — | 1 to 2 | 6 | 6 |

TABLE 1-continued

| | | | | | | | | | |
|---|---|---|---|---|---|---|---|---|---|
| 140° F. Oven (% vol. change) | — | 0.2 | 0.2 | — | −4.4 to 13.0 | — | −0.6 | — | — |
| E84 Result (FSI/smoke) | 215/500 | 55/195 | 30/40 | — | — | — | — | — | — |

| | Example | | | | | | | | |
|---|---|---|---|---|---|---|---|---|---|
| Ingredient | 19 | 20 | 21 | 22 | 23 | 24 | 25 | 26 | 27 |
| POLYOL 1 | 52.38 | — | 52.38 | 49.92 | 53.14 | — | — | — | — |
| POLYOL 2 | 17.45 | — | 17.45 | 18.47 | 19.62 | 19.62 | — | — | — |
| POLYOL 3 | — | 45.60 | — | — | — | 53.14 | 44.74 | 43.79 | 44.74 |
| POLYOL 4 | — | — | — | — | — | — | — | — | — |
| POLYOL 5 | — | 3.00 | — | — | — | — | 2.92 | 3.00 | 2.92 |
| POLYOL 6 | — | 21.00 | — | — | — | — | 20.37 | 20.00 | 20.37 |
| SURFACTANT 1 | 2.12 | — | 2.12 | 2.12 | 2.91 | 2.12 | — | — | — |
| SURFACTANT 2 | — | 2.13 | — | — | — | — | 2.13 | 2.10 | 2.13 |
| SURFACTANT 3 | — | — | — | — | — | — | — | — | — |
| SURFACTANT 4 | — | — | — | — | — | — | — | — | — |
| CATALYST 1 | 0.34 | 0.91 | 0.34 | 1.00 | 1.00 | 1.00 | — | — | — |
| CATALYST 2 | — | 0.31 | — | — | — | — | 0.70 | 0.70 | 0.70 |
| CATALYST 3 | 0.15 | — | 0.15 | 0.95 | 0.95 | 0.95 | — | — | — |
| CATALYST 4 | 4.50 | 5.00 | 4.50 | 6.00 | 6.00 | 6.00 | 4.07 | 4.00 | 4.07 |
| CATALYST 5 | 2.10 | 2.03 | 2.10 | 1.30 | 1.30 | 1.30 | 2.03 | 2.00 | 2.03 |
| CATALYST 6 | — | — | — | — | — | — | 0.25 | 0.25 | 0.25 |
| CATALYST 7 | — | — | — | — | — | — | 0.70 | 0.70 | 0.70 |
| ADDITIVE 1 | 4.00 | 5.29 | 4.00 | 3.49 | 4.00 | 4.00 | 5.28 | 5.20 | 5.28 |
| ADDITIVE 2 | — | 4.00 | — | — | — | — | 5.08 | 5.00 | 5.08 |
| Water | 1.26 | 1.63 | 1.26 | 1.25 | 1.87 | 1.87 | 1.73 | 1.70 | 1.73 |
| HFO LBA | — | — | 13.50 | — | — | — | — | 11.56 | — |
| HFO GBA | 13.50 | 10.00 | — | 13.30 | 10.00 | 10.00 | 10.00 | — | 10.00 |
| ISOCYANATE | 125.21 | 119.02 | 125.21 | 124.99 | 129.17 | 129.01 | 121.99 | 121.04 | 122.04 |
| Index | 1.92 | 1.48 | 1.92 | 1.91 | 1.67 | 1.68 | 1.48 | 1.49 | 1.42 |
| Gel time (before aging) | 23 | 24 | — | — | — | — | 22 | — | 23 |
| Gel time (after aging) | 25 | 25 | — | — | — | — | 28 | — | — |
| density (before aging) | — | — | — | — | — | — | — | 1.89-1.93 | 1.95 |
| density (after aging) | — | — | — | — | — | — | — | 1.93 | — |
| Mini burn rating (FSI/smoke) | — | 30/199 | Failed | — | — | — | — | — | 29/327 |
| foam green strength (mm) | — | 16 to 19 | 14 | — | — | — | 14 to 16 | — | — |
| panel deflection (inches) | — | 0.36-0.43 | 0.35 | — | — | — | — | 0.32 to 0.34 | — |
| Panel Bow Weight (lbs) | — | 83-90 | 85 | — | — | 85 | — | — | 88 to 90 |
| Blend shelf-life (days at 60° C. | >1 | 1 to 2 | 6 | — | — | — | <1 | — | <1 |
| 140° F. Oven (% vol. change) | — | −0.6 | 0.8 to 1.5 | — | — | 0.8 | — | — | −0.6 |
| E84 (FSI/smoke) | — | — | — | — | — | Failed | — | — | 15/350 |

[1] To assess green strength, the "B-side" (all ingredients except the ISOCYANATE) was combined with the ISOCYANATE, mixed for 4 seconds and poured into 83 oz paper cup. Reactivity checks on the foam were done for Cream Time, Gel Time, & Tack-Free Time. Within 50 seconds of mixing, the cup was placed on a scissor jack and raised to align the crown of foam under a 10 lb. weight plunger until the crown of the foam contacted the plunger. At about 60 second after mixing, the weighted plunger was dropped by turning the set screw holding the weighted plunger counterclockwise for 1 full rotation. At 120 seconds after mixing, the location of the plunger was marked. Then, the scissor jack knob was rotated clockwise to raise the jack and the number of millimeters needed to return to the Zero mark was recorded. For systems with 20-30 second gel times, past values of 12-19 mm of deflection proved to have good green strength. Where a 28 mm value proved to be poor.

[2] To assess panel deflection, a set of 2 scissor jacks were set at same height (about 5.5 inches high) on each side of a stand base plate (14 inches apart) with a dial indicator attached to stand shaft. 520 grams of the foam-forming composition was prepared and poured into a 2" thick x 13" wide x 25" high vertical lab press mold frame, with the top lid off allowing the foam to flow freely out of the mold top. The foam was demolded at 50-70 seconds and removed from the press and molded frame before 90 seconds. The foam panel was placed horizontally across the scissor jacks with the dial indicator set at zero on top surface of panel. At 120 seconds after mixing, a 10 pound weight was placed across the center of the foam panel next to the digital indicator, but not touching the indicator. Deflection reading were recorded at 2.5, 3.0, 3.5, 4.0, 4.5, 5.0, 5.5 minutes. The weight was removed at 5.5 minutes and the last reading recorded at 6.5 minutes. A value of 0.32-0.43" of deflection was considered to reflect good panel deflection. A value greater than 0.50" reflect a poorer panel deflection.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-reactive composition comprising:
   (a) a polyol composition comprising:
     (1) 50% to 90% by weight, based on total weight of the polyol composition, of an aromatic polyester polyol having a functionality of 1.5 to 2.5 and an OH number of 150 to 360 mg KOH/g;
     (2) an amine-initiated polyether polyol having an OH number of more than 500 mg KOH/g and a functionality of 2.5 to 4; and
     (3) a hydroxyl-initiated polyether polyol having an OH number of 200 to 500 mg KOH/g and a functionality of 3 to 6;
   (b) a blowing agent composition comprising:
     (1) a hydrofluoroolefin (HFO); and
     (2) water; and (c) a catalyst composition comprising:
(1) a morpholine;
(2) an imidazole;
(3) a quaternary ammonium carboxylate; and
(4) a metal carboxylate,
wherein the morpholine and imidazole are present in a combined amount of 4 to less than 10% by weight, based on the total weight of the isocyanate-reactive composition.

2. The isocyanate-reactive composition of claim 1, wherein the amine-initiated polyol comprises an alkanolamine-initiated polyether polyol comprising a reaction product of an alkylene oxide with an H-functional starter,
wherein the alkanolamine comprises a compound represented by the formula:

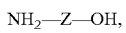

in which Z represents a divalent radical which is a straight chain or branched chain alkylene radical having 2 to 6 carbon atoms, a cycloalkylene radical having 4 to 6 carbon atoms or a dialkylene ether radical having 4 to 6 carbon atoms.

3. The isocyanate-reactive composition of claim 1, wherein the amine-initiated polyether polyol has an OH number of 600 to 800 mg KOH/g and a functionality of 2.5 to 3.5.

4. The isocyanate-reactive composition of claim 1, wherein the aromatic polyester polyol and the amine-initiated polyether polyol are present in the polyol composition in a weight ratio of at least 10:1.

5. The isocyanate-reactive composition of claim 1, wherein the hydroxyl-initiated polyether polyol comprises a polyether polyol having a hydroxyl functionality of more than 4.0 to 6.

6. The isocyanate-reactive composition of claim 5, wherein the polyether polyol having a hydroxyl functionality of than 4.0 to 6 a saccharide initiated polyether polyol.

7. The isocyanate-reactive composition of claim 6, wherein the ratio, by weight, of aromatic polyester polyol to saccharide initiated polyether polyol in the polyol composition is at least 2:1 and the ratio, by weight, of saccharide initiated polyether polyol to amine-initiated polyether polyol in the polyol composition is at least 2:1.

8. The isocyanate-reactive composition of claim 6, wherein the polyol composition further comprises a low functionality polyether polyol having a hydroxyl functionality of less than 4.0 and an OH number of 200 to 600 mg KOH/g.

9. The isocyanate-reactive composition of claim 8, wherein the low-functionality polyether polyol is present in an amount such that the ratio, by weight, of aromatic polyester polyol to low-functionality polyether polyol in the polyol composition is at least 2:1 and the ratio, by weight, of low-functionality polyether polyol to amine-initiated polyether polyol in the polyol composition is at least 1.5:1.

10. The isocyanate-reactive composition of claim 1, wherein the polyol composition comprises less than 5% by weight of ethylene oxide, based on the total weight of polyether polyol that is present in the polyol composition.

11. The isocyanate-reactive composition of claim 1, wherein the HFO comprises 1,3,3,3-tetrafluoropropene and/or 1-chloro-3,3,3-trifluoropropene that is present in an amount of at least 10% by weight, based on the total weight of the isocyanate-reactive composition.

12. The isocyanate-reactive composition of claim 1, wherein the HFO and water are present in an amount of at least 90% by weight, based on the total weight of the blowing agent composition.

13. The isocyanate-reactive composition of claim 12, wherein the HFO and water are present in the blowing agent composition at a weight ratio of at least 2:1.

14. The isocyanate-reactive composition of claim 1, wherein the morpholine is present in an amount of 80 to 99% by weight, based on the total combined weight of morpholine and imidazole, and the imidazole is present in an amount of 1 to 20%, based on the total combined weight of the morpholine and imidazole.

15. The isocyanate-reactive composition of claim 14, wherein the quaternary ammonium carboxylate is present in the isocyanate-reactive composition in an amount of 0.5 to 2.0% by weight, based on the total weight of the isocyanate-reactive composition and the metal carboxylate and the quaternary ammonium carboxylate are present in the catalyst composition in a relative weight ratio of metal carboxylate to quaternary ammonium carboxylate of greater than 1:1.

16. The isocyanate-reactive composition of claim 1, wherein:
(i) the morpholine is present in the catalyst composition in an amount of at least 50% by weight, based on the total combined weight of morpholine, imidazole, quaternary ammonium carboxylate and metal carboxylate;
(ii) the imidazole is present in the catalyst composition in an amount of 1 to 10% by weight, based on the total combined weight of morpholine, imidazole, quaternary ammonium carboxylate and metal carboxylate;
(iii) the quaternary ammonium carboxylate is present in the catalyst composition in an amount of 1 to 20% by weight, based on the total combined weight of morpholine, imidazole, quaternary ammonium carboxylate and metal carboxylate; and
(iv) the metal carboxylate is present in the catalyst composition in an amount of at least 10% by weight, based on the total combined weight of morpholine, imidazole, quaternary ammonium carboxylate and metal carboxylate.

17. A process for producing a rigid polyurethane-polyisocyanurate foam comprising mixing a polyisocyanate with the isocyanate-reactive composition of claim 1 at an isocyanate index of 90 to 180.

18. A foam-forming composition comprising:
(a) a polyol composition comprising:
(1) 50% to 90% by weight, based on total weight of the polyol composition, of an aromatic polyester polyol having a functionality of 1.5 to 2.5 and an OH number of 150 to 360 mg KOH/g; and
(2) an amine-initiated polyether polyol having an OH number of more than 500 mg KOH/g and a functionality of 2.5 to 4;
(b) a blowing agent composition comprising:
(1) a HFO; and
(2) water;
(c) a catalyst composition comprising:
(1) a morpholine;
(2) an imidazole;
(3) a quaternary ammonium carboxylate; and
(4) a metal carboxylate,
(d) a polyisocyanate in an amount sufficient to provide an isocyanate index of 90 to 180; and
wherein the morpholine and imidazole are present in combined amount of 4 to less than 10% by weight, based on the total weight of the foam-forming composition except the weight of the polyisocyanate.

19. The foam-forming composition of claim 18, wherein the HFO comprises 1,3,3,3-tetrafluoropropene and/or 1-chloro-3,3,3-trifluoropropene that is present in an amount of at least 10% by weight, based on the total weight of the foam-forming composition except the weight of the polyisocyanate and wherein the HFO and water are present in an amount of at least 90% by weight, based on the total weight of the blowing agent composition.

20. The foam-forming composition of claim 18, wherein:
(i) the morpholine is present in the catalyst composition in an amount of at least 50% by weight, based on the total combined weight of morpholine, imidazole, quaternary ammonium carboxylate and metal carboxylate;
(ii) the imidazole is present in the catalyst composition in an amount of 1 to 10% by weight, based on the total combined weight of morpholine, imidazole, quaternary ammonium carboxylate and metal carboxylate;
(iii) the quaternary ammonium carboxylate is present in the catalyst composition in an amount of 1 to 20% by weight, based on the total combined weight of morpholine, imidazole, quaternary ammonium carboxylate and metal carboxylate; and
(iv) the metal carboxylate is present in the catalyst composition in an amount of at least 10% by weight, based on the total combined weight of morpholine, imidazole, quaternary ammonium carboxylate and metal carboxylate.

* * * * *